United States Patent
Utsugi et al.

(10) Patent No.: US 7,419,747 B2
(45) Date of Patent: Sep. 2, 2008

(54) ELECTROLYTE FOR SECONDARY BATTERY AND SECONDARY BATTERY USING SAME

(75) Inventors: Koji Utsugi, Tokyo (JP); Mitsuhiro Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 10/726,013

(22) Filed: Dec. 3, 2003

(65) Prior Publication Data

US 2005/0100795 A1  May 12, 2005

(51) Int. Cl.
*H01M 6/16* (2006.01)

(52) U.S. Cl. .................. 429/340; 429/338; 429/326; 429/188; 429/231.1; 429/231.4; 429/231.8; 429/231.95

(58) Field of Classification Search ............ 429/340, 429/338, 326, 188, 231.1, 231.4, 231.8, 231.95
See application file for complete search history.

(56) References Cited

U.S. PATENT DOCUMENTS 7,163,768 B2 *  1/2007  Utsugi et al. ............... 429/340

FOREIGN PATENT DOCUMENTS

| | | |
|---|---|---|
| CN | 1290408 A | 4/2001 |
| JP | 60-154478 | 8/1985 |
| JP | 62-100948 | 5/1987 |
| JP | 63-102173 | 5/1988 |
| JP | 4-169075 | 6/1992 |
| JP | 5-74486 | 3/1993 |
| JP | 5-82138 | 4/1993 |
| JP | 5-275077 | 10/1993 |
| JP | 6-52887 | 2/1994 |
| JP | 7-122296 | 5/1995 |
| JP | 7-302617 | 11/1995 |
| JP | 8-45545 | 2/1996 |
| JP | 8-250108 | 9/1996 |
| JP | 10-50342 | 2/1998 |
| JP | 10-189041 | 7/1998 |
| JP | 11-260401 | 9/1999 |
| JP | 11-288706 | 10/1999 |
| JP | 11-339850 | 12/1999 |
| JP | 2000-3724 | 1/2000 |
| JP | 2000-138071 | 5/2000 |
| JP | 2000-208169 | 7/2000 |
| JP | 2000-235866 | 8/2000 |
| JP | 2000-294278 | 10/2000 |
| JP | 2001-35530 | 2/2001 |

OTHER PUBLICATIONS

The Autumn Conference 2000 of the Electrochemical Society of Japan, Sep. 2000, Chiba Institute of Technology, Lecture No. 2A24, p. 24.
Katsuro Yamauchi, et al., "Dynamic Surface Modification of lithium Metal Anode with Imide Electolyte", The 41st Battery Symposium in Japan, Nov. 2000, Nagoya Congress Center, Lecture No. 1E03, pp. 524-525.
Chinese Office Action dated Oct. 14, 2005.

* cited by examiner

*Primary Examiner*—Laura S Weiner
(74) *Attorney, Agent, or Firm*—McGinn IP Law Group, PLLC

(57) ABSTRACT

An electrolyte for a secondary battery containing an aprotic solvent which contains at least imide anion, transition metal ion and a compound containing a sulfonyl group in an aprotic solvent 15. The electrolyte has the performance such as the excellent energy density and electromotive force, and the secondary battery using the electrolyte is excellent in the cycle life and the safety.

23 Claims, 1 Drawing Sheet

[FIG. 1]
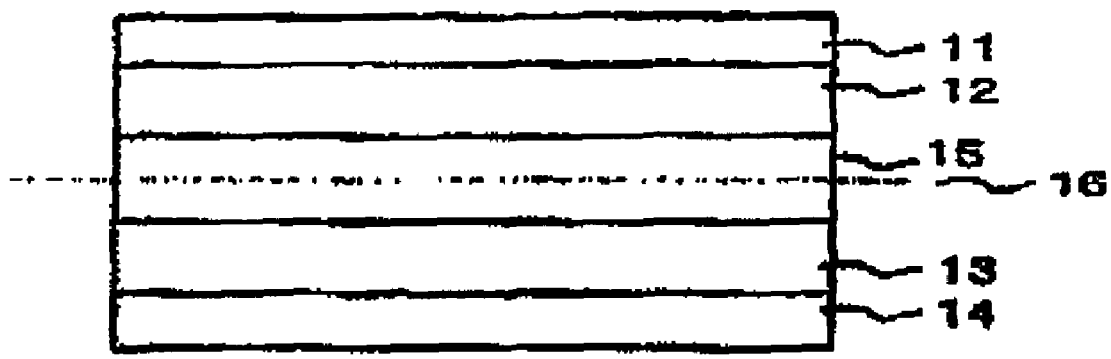

ELECTROLYTE FOR SECONDARY BATTERY AND SECONDARY BATTERY USING SAME

TECHNICAL FIELD

The present invention relates to an electrolyte for a secondary battery and a secondary battery using the same.

BACKGROUND ART

A non-aqueous electrolyte lithium ion or lithium secondary battery using a carbon material, an oxide, lithium alloy or lithium metal as an anode is attracting attention as a power source for a cellular phone and a notebook computer because of a higher energy density realized thereby.

A film referred to as a surface film, a protection film, SEI or a membrane (hereinafter referred to as "surface film") is known to be formed on the cathode surface of the secondary battery. The control of the surface film was known to be indispensable for providing higher technical performances because the surface film largely affects a charge-discharge efficiency, a cycle life and safety.

The reduction of the irreversible capacity is necessary in the carbon material and the oxide material, and problems must be solved with respect to the reduction of the charge-discharge efficiency and to the deterioration of the safety which may be due to formation of dendrite in the lithium metal or the alloy anode.

A variety of techniques have been proposed for solving the above problems. For example, the formation of a film made of lithium fluoride on the surface of the lithium metal or the lithium alloy by using a chemical reaction has been proposed for suppressing the dendrite formation.

JP-A-7(1995)-302617 discloses an anode of which a surface is covered with lithium fluoride prepared by dipping the lithium anode in an electrolyte containing hydrofluoric acid thereby reacting the anode with the hydrofluoric acid.

The hydrofluoric acid is generated by the reaction between $LiPF_6$ and a small amount of water. On the other hand, lithium hydroxide or lithium oxide is formed on the surface of the lithium anode by means of natural oxidation in air. The reaction between them generates the lithium fluoride surface film on the anode surface.

However, the lithium fluoride film formed by the reaction between an electrode interface and a liquid is liable to be contaminated with a side-reaction component in the surface film to hardly provide a uniform film. When the surface film such as the lithium hydroxide and the lithium oxide is not uniformly formed or a part of the lithium is exposed, a problem arises with respect to the safety due to the reaction between the water or the hydrofluoric acid and the lithium in addition to the inability of forming the uniform thin film. When the reaction is insufficient, an unnecessary ingredient may remain to exert ill-effects such as reduction of ionic conductivity.

Further, in the method of forming the fluoride layer by utilizing the chemical reaction on the interface, the choice range of the usable fluoride and electrolyte is restricted and the stable surface film can be hardly formed with a good yield.

JP-A-8(1996)-250108 discloses a surface film made of lithium fluoride on an anode surface generated by the reaction between a mixed gas including argon and hydrogen fluoride and aluminum-lithium alloy.

However, when the surface film is present on the lithium metal surface in advance, especially when a plurality of compounds exist, the reaction is likely to be non-uniform to hardly form the lithium fluoride film uniformly. Accordingly, the lithium secondary battery with the sufficient cycle performance is obtained with difficulty.

JP-A-11(1999)-288706 discloses a technique in which a surface film structure having a sodium chloride crystalline structure component, as a main component, is produced on the surface of a uniform crystalline structure, that is, a lithium sheet having a (100) crystalline plane preferentially oriented. In this manner, a uniform depositing and dissolving reaction or the charge and discharge of the battery can be performed to suppress the dendrite deposition of the lithium metal to improve the cycle life of the battery.

It is described that the material used for the surface film is preferably a halide of lithium and that a solid solution consists of at least one compound selected from LiCl, LiBr and LiI, and LiF is preferably used.

Specifically, in order to produce the solid solution film consisting of at least one compound selected from LiCl, LiBr and LiI, and LiF, the anode for a non-aqueous electrolyte battery is fabricated by dipping the lithium sheet having the preferentially oriented (100) crystalline plane prepared by pressing (rolling) into an electrolyte containing at least one of a chlorine molecule or chlorine ion, a bromine molecule or bromine ion and an iodine molecule or iodine ion, and a fluorine molecule or fluorine ion.

In this technique, the rolled lithium metal sheet is likely to be exposed to atmospheric air. Accordingly, a film originating from moisture is easily formed on the surface to non-uniformize the existence of active points, thereby hardly fabricating the intended stable surface film so that the effect of suppressing the dendrite formation cannot be necessarily and sufficiently obtained.

Techniques for improving the capacity and the charge-discharge efficiency have been reported when a carbon material such as graphite and amorphous carbon which can occlude and release lithium ion is used as the anode material.

JP-A-5(1993)-275077 proposes an anode made of a carbon material the surface of which is coated with a thin film made of a lithium ion conductive solid electrolyte. Thereby, the decomposition of the solvent due to the use of the carbon material is suppressed to provide, especially, a lithium ion secondary battery using propylene carbonate.

However, cracks generated in the solid electrolyte by the stress change during the insertion and desorption of the lithium ion invites the performance deterioration. The non-uniformity such as crystalline deficiency of the solid electrolyte can not provide the uniform reaction on the anode surface, thereby shortening the cycle life.

JP-A-2000-3724 discloses a secondary battery including an anode made of a graphite-containing material, and an electrolyte containing a cyclic carbonate and a linear carbonate, as main components, and further 1,3-propanesultone and/or 1,4-butanesultone I a range from 0.1% weight to 4% in weight.

The 1,3-propanesultone and the 1,4-butanesultone are supposed to contribute to formation of a passivation film on the carbon material surface to cover the active and highly crystallized carbon material such as natural graphite and artificial graphite with the passivation film, thereby suppressing the electrolyte decomposition without impairing the normal reaction of the battery.

Naoi et. el., reported the effect of a complex between a lanthanoid transition metal such as europium and imide anion, to the lithium metal anode in the academic conferences such as the Autumn Conference 2000 of the Electrochemical Society of Japan (September, 2000; Chiba Institute of Technology; Lecture No.:2A24) and the 41$^{st}$ Battery Symposium in Japan (November, 2000; Nagoya Congress Center; Lecture No.:1E03).

The surface film herein made of an Eu[N(C$_2$F$_5$O$_2$)$_2$]$_3$ complex is formed on Li metal dipped in an electrolyte which is prepared by dissolving LiN(C$_2$F$_5$O$_2$)$_2$ acting as a lithium salt into a mixed solvent of propylene carbonate or ethylene carbonate and 1,2-dimethoxyethane and further by adding Eu(CF$_3$SO$_3$)$_3$ as an adding agent thereto.

However, the above prior arts have the following common problems.

While the surface film formed on the anode surface is deeply concerned with the charge-discharge efficiency, the cycle life and the safety affected by its property, no method does not yet exist which can control the film property for a longer period of time.

When, for example, the surface film made of lithium halide or glassy oxide is formed on a layer made of lithium or its alloy, the effect of suppressing the dendrite formation can be obtained at a specific degree at the initial stage of use, however, after the repeated use, the surface film is deteriorated to lower its performance as a protection film.

The reason thereof seems that because the layer made of the lithium or its alloy changes its volume by the occlusion and the release of the lithium while the film thereon made of the lithium halide scarcely changes its volume, the internal stress is generated in the layers and on its interface.

The generation of the internal stress is supposed to damage a part of the surface film, especially, made of the lithium halide, thereby reducing the function of suppressing the dendrite formation.

In connection with the carbon material such as the graphite, an electric charge produced by the decomposition of the solvent molecule or the anion appears as an irreversible capacity component to invite the reduction of the initial charge-discharge efficiency. The composition, the crystalline state and the stability of the film generated thereby largely influence the subsequent efficiency and cycle life.

In the method of forming the organic surface layer on the lithium metal surface investigated by Naoi et al., the effect of improving the cycle life is obtained to a certain extent compared with the other prior art, however, it is not yet sufficient.

Although the researches have been advancing for intending the improvement of the charge-discharge efficiency and the cycle life by forming the film on the anode for the secondary battery, the sufficient performance has not yet been obtained, and the largest problem is how the film of providing the stability and the sufficient charge-discharge efficiency is formed.

DISCLOSURE OF INVENTION

The vigorous investigations of the present inventors have revealed that a secondary battery having an excellent charge-discharge efficiency and a good cycle performance is obtained when the secondary battery is fabricated by using an electrolyte composed of an aprotic solvent containing at least imide anion, transition metal ion and a compound having a sulfonyl group and when the secondary battery is fabricated by using an electrolyte composed of an aprotic solvent dissolving a lithium salt as an electrolyte salt and containing at least a transition metal complex made up of imide anion and transition metal ion, and a compound having a sulfonyl group.

In the system where the transition metal ion and the imide anion are present, the metal complex made up of the imide anion and the transition metal ion is formed on the anode surface by the charging and the discharging [the Autumn Conference 2000 of the Electrochemical Society of Japan (September, 2000; Chiba Institute of Technology; Lecture No.:2A24) and the 41$^{st}$ Battery Symposium in Japan (November, 2000; Nagoya Congress Center; Lecture No.:1E03)].

When the metal complex made up of the transition metal ion and the imide anion exists, the metal complex is adsorbed on the anode surface regardless of the charging and the discharging.

The existence of the two compounds or the metal complex made up of the imide anion and the transition metal ion and the compound having the sulfonyl group brings about the following effects.

Dangling bonds inducing the reaction with the solvent molecule and sites having no reactivity are present on the anode surface. The metal complex produced by the addition of the imide salt and the metal complex made up of the imide anion and the transition metal ion are adsorbed on the sites having no reactivity to form the stabilized film, thereby producing the lithium ion conduction. The compound having the sulfonyl group contributes to the formation of the passivation film on the anode surface resulting in the suppression of the decomposition of the solvent molecule.

A specific example of the imide anion includes —N(C$_n$F$_{2n+1}$SO$_2$)(C$_m$F$_{2m+1}$SO$_2$) wherein "n" and "m" are natural numbers.

The transition metal in the present invention is preferably a lanthanoid transition metal, and especially europium (Eu), neodymium (Nd), erbium (Er) and holmium (Ho) are preferable.

The imide anion and the metal complex are preferably contained in the electrolyte in a range from 0.01 to 10% in weight. The sufficient effect for the film formation on the anode surface may not be obtained below 0.01% in weight, and the insufficient dissolution of the electrolyte may take place and the viscosity of the electrolyte may become large over 10% weight so that these are not preferable. The more preferable range is from 0.05 to 5% in weight in the present invention.

The specific compound having the sulfonyl group includes sulforane (JP-A-60(1985)-154478), 1,3-propane-sultone and 1,4-butanesultone (JP-A-62(1987)-100948, JP-A-63(1988)-102173, JP-A-11(1999)-339850 and JP-A-2000-3724), alkane sulfonic acid anhydride (JP-A-10(1998)-189041), 1,3,2-dioxaphosphorane-2-oxide derivative (JP-A-10(1998)-50342), γ-sultone compound (JP-A-2000-235866) and sulfolene derivative (JP-A-2000-294278), and is not restricted thereto.

The compound having the sulfonyl group is preferably contained in the electrolyte in a range from 0.01 to 10% in weight. The sufficient effect for the film formation on the anode surface is not frequently obtained below 0.01% in weight, and the insufficient dissolution of the electrolyte may take place and the viscosity of the electrolyte may become large over 10% in weight so that these are not preferable. The more preferable range is from 0.05 to 5% in weight in the present invention.

In accordance with the present invention, the addition or the mixing of vinylene carbonate or its derivative to the electrolyte can further improve the cycle performance. As the vinylene carbonate or its derivative, compounds described in JP-A-4(1992)-169075, JP-A-7(1995)-122296, JP-A-8(1996)-45545, JP-A-5(1993)-82138, JP-A-5(1993)-74486, JP-A-6(1994)-52887, JP-A-11(1999)-260401, JP-A-2000-208169, JP-A-2001-35530 or JP-A-2000-138071 can be suitably selected and used.

The effect can be obtained when the vinylene carbonate or its derivative is contained as an adding agent in the electrolyte in a range from 0.01 to 10% in weight. The effect can be obtained when it is contained as the solvent in a range from 1 to 50% in weight.

The aprotic organic solvent used in the present invention includes cyclic carbonates, linear carbonates, aliphatic carbonic acid esters, γ-lactones, cyclic ethers, linear ethers and their fluorinated derivatives. One solvent is used or two or more solvents suitably selected therefrom are mixed and used.

The lithium salt of the present invention is preferably $LiPF_6$, $LiBF_4$, $LiAsF_6$, $LiSbF_6$, $LiClO_4$, $LiAlCl_4$, $LiN(C_nF_{2n+1}SO_2)(C_mF_{2m+1}SO_2)$ wherein "n" and "m" are natural numbers, and $LiPF_6$ and $LiBF_4$ are especially preferable.

In accordance with the present invention, the secondary battery having the cathode containing the lithium as the active material, the anode and the above electrolyte for the battery can be provided.

An anode active material is used as an anode such as a material which can occlude and release the lithium, lithium metal, a metallic material which can form alloy with the lithium and an oxide material.

The material which can occlude and release the lithium preferably contains carbon, and especially graphite and amorphous carbon.

The electrolyte of the present invention can be prepared by adding, in advance, the imide anion and the transition metal ion or the transition metal complex made up of the imide anion and the transition metal ion which provides the stable film and further by adding the compound having the sulfonyl group.

The transition metal complex herein refers to a stable complex in which the transition metal is coordinated with the imide anion. The adsorption of the complex on the anode surface stabilizes the anode surface.

The compound having the sulfonyl group reacts with the dangling bonds on the anode interface to form the stable film.

These two functions (adsorption and reaction) can suppress the decomposition of the solvent molecule to improve the cycle performance.

Especially when the anode is the metal lithium, these functions uniformizes the distribution of current density to suppress the dendrite formation by the alloying of the lithium with a part of the lithium fluoride which is a reaction product with the lithium, and the transition metal.

The reaction with the lithium on the anode surface and the imide anion adsorbed on the anode surface forms a thin and stable lithium fluoride film. When the film is mechanically damaged, the lithium on the anode surface and the imide anion adsorbed on the anode surface react with each other on the damaged section to repair the film. Accordingly, containing the imide anion realizes the cycle life with a longer period of time.

After the anode and the cathode having the lithium as the active materials are combined sandwiching a separator and inserted in a battery external package can in the present invention, the electrolyte containing the metal complex is impregnated to form the above film by charging the battery during the sealing of the battery external package can or after the sealing.

As described, the present invention provides the lithium secondary battery with the excellent cycle life and safety having the performance such as the excellent energy density and electromotive force and using the electrolyte for the secondary battery composed of the aprotic solvent containing the imide anion, the transition metal ion and the compound having the sulfonyl group; or using the electrolyte prepared by adding at least the metal complex made up of the imide anion and the transition metal ion, and the compound having the sulfonyl group to the aprotic solvent dissolving the lithium salt.

The above and other objects, features and advantages of the present invention will be more apparent from the following description.

BRIEF DESCRIPTION OF DRAWINGS

FIG. 1 is a schematic view exemplifying a secondary battery in accordance with the present invention.

BEST MODE FOR IMPLEMENTING INVENTION

A schematic structure of one example of the battery of the present invention is shown in FIG. 1.

The illustrated battery includes a cathode current collector 11, a cathode active material-containing layer 12 containing one of an oxide or a sulfur compound which can occlude and release lithium ion, electro-conductive polymer and a stabilized radical compound or a mixture thereof, an anode active material-containing layer 13 containing one of a carbon material or an oxide which can occlude and release lithium ion, a metal forming alloy with the lithium and the lithium metal itself or a mixture thereof, an anode current collector 14, an electrolyte 15 and a porous separator 16 containing the electrolyte.

Imide anion, or a metal complex made up of imide anion and transition metal ion and a compound having a sulfonyl group are contained in the electrolyte 15 which contains imide anion or a lithium salt as an electrolyte.

As the electrolyte of the present invention, one solvent or two or more mixed solvents selected from below can be used, that is, cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethylmethyl carbonate (EMC) and dipropyl carbonate (DPC); aliphatic carboxylate esters such as methyl formate, methyl acetate and ethyl propionate; γ-lactones such as γ-butyrolactone; linear ethers such as 1,2-ethoxyethane (DEE) and ethoxymethoxyethane (EME); cyclic ethers such as tetrahydrofuran and 2-methyltetrahydrofuran; and an aprotic solvent such as dimethyl sulfoxide, 1,3-dioxorane, formamide, acetamide, dimethylformamide, actonitrile, propylnitrile, nitromethane, ethylmonoglyme, triesterphosphate, trimethoxymethane, dioxolane derivatives, sulforane, methylsulforane, 1,3-dimethyl-2-imidazolidinone, 3-methyl-2-oxazolidinone, propylene carbonate derivatives, tetrahydrofuran derivatives, ethylether, 1,3-propane sultone, anisole, N-methylpyrrolidone and fluorinated carboxylate ester. A lithium salt is dissolved in these organic solvents. The lithium salt includes lithium imide salts, $LiPF_6$, $LiAsF_6$, $LiAlCl_4$, $LiClO_4$, $LiBF_4$ and $LiSbF_6$.

The electrolyte of the present invention is prepared by one of the two methods, that is, by dissolving the imide compound and the transition metal salt followed by the dissolution of the compound having the sulfonyl group, or by dissolving the metal complex made up of the transition metal ion and the imide anion in advance and then dissolving the compound having the sulfonyl group.

In the former method, the imide compound and the transition metal salt form the metal complex on the anode through the charge-discharge process.

In the latter method, the metal complex synthesized in advance is adsorbed on the anode after the dissolution into the electrolyte.

The adsorption of the metal complex containing the imide anion on the anode surface in the electrolyte adjusts a uniform electric field during the charging to provide a flat and smooth lithium occlusion or deposition process. Especially, the lithium metal generates the chemically and physically rigid film having the lower resistance on the anode.

The components of the surface film are the transition metal partially deposited and the lithium fluoride generated by the reaction between the lithium and the fluorine contained in the imide anion. The deposited transition metal is stabilized by the formation of alloy with the lithium, and the lithium fluoride is a chemically and physically stable compound.

When the imide compound and the transition metal salt are dissolved followed by the dissolution of the compound having the sulfonyl group, the ratio of the imide compound and the transition metal salt in the electrolyte is not especially restricted, and is preferably in a range from 0.005 to 10% in weight. Below 0.005% in weight, the effect of the adding agent does not extend to the entire surface of the electrode, and over 10% in weight, the viscosity of the electrolyte increases to make the liquid resistance higher.

At this time, a range of the compound having the sulfonyl group contained in the entire electrolyte is preferably from 0.01 to 10% in weight. Below 0.01% in weight, the effect of the adding agent does not extend to the entire surface of the electrode, and over 10% in weight, the viscosity of the electrolyte increases to make the liquid resistance higher.

When the metal complex made up of the transition metal ion and the imide anion is dissolved in advance followed by the dissolution of the compound having the sulfonyl group, the ratio of the metal complex contained in the electrolyte with respect to the entire electrolyte is not especially restricted, and is preferably in a range from 0.005 to 10% in weight. Below 0.005% in weight, the effect of the adding agent does not extend to the entire surface of the electrode, and over 10% in weight, the viscosity of the electrolyte increases to make the liquid resistance higher. At this time, a range of the compound having the sulfonyl group contained in the entire electrolyte is preferably from 0.01 to 10% in weight. Below 0.01% in weight, the effect of the adding agent does not extend to the entire surface of the electrode, and over 10% in weight, the viscosity of the electrolyte increases to make the liquid resistance higher.

The transition metal is preferably a lanthanoid transition metal such as europium (Eu), neodymium (Nd), erbium (Er) and holmium (Ho) or a mixture thereof. This is because the redox potentials of the Eu, the Nd, the Er and the Ho are the same as or close to those of the graphite, the alloy and the lithium metal, and the reduction can be possible at a potential higher than that of the lithium by 0 to 0.8 V.

The selection of the metal having the redox potential close to the anode active material and of the anion of forming the stable complex with the above metal makes the metal to be hardly reduced. Accordingly, the complex made up of the lanthanoid metal ion and the imide anion can stably exist on the interface between the anode and the electrolyte.

As the imide anion, $-N(C_nF_{2n+1}SO_2)(C_mF_{2m+1}SO_2)$ is preferable, wherein "n" and "m" are natural numbers, and perfluoroethylsulfonylimide ion $[-N(C_2F_5SO_2)_2]$ is especially preferable for suppressing aluminum corrosion.

When the film is mechanically damaged, the lithium on the anode surface and the imide anion adsorbed on the anode surface react with each other to generate the lithium fluoride which has the function of repairing the damaged film. Accordingly, even after the film is damaged, the effect of introducing the formation of the stable surface compound is secured.

As described, the anode of the present invention is made of the lithium metal, the lithium alloy or the material which can occlude and release the lithium such as the carbon material and oxide.

The carbon material includes the graphite, the amorphous carbon, diamond-like carbon, carbon nano-tube occluding the lithium and a composite thereof.

As the oxide, one of silicon oxide, tin oxide, indium oxide, zinc oxide, lithium oxide, phosphoric acid and boric acid or a composite thereof can be used, and especially, the silicon oxide is preferably included therein. Its structure is preferably an amorphous state. This is because the stable silicon oxide does not induce a reaction with another compound and the amorphous structure does not introduce any deterioration due to the non-uniformity such as crystal grain boundary and deficiency. A film-forming method such as a vapor deposition method, a CVD method and a sputtering method can be employed.

The lithium alloy is composed of the lithium and the metal which can form the alloy with the lithium. The binary or ternary alloy is composed of the metal such as Al, Si, Pb, Sn, In, Bi, Ag, Ba, Ca, Hg, Pd, Pt, Te, Zn and La, and the lithium. The amorphous lithium metal or lithium alloy is preferable. This is because the amorphous structure hardly introduces any deterioration due to the non-uniformity such as crystal grain boundary and deficiency.

The lithium metal and the lithium alloy can be formed by using a suitable method such as a melt cooling method, a liquid rapid cooling method, an atomization method, a vacuum deposition method, a sputtering method, a plasma CVD method, a photo-assisted CVD method, a thermal CVD method and a sol-gel method.

The existence of the complex made up of the imide anion and the transition metal ion on the interface between the anode and the electrolyte provides the excellent flexibility with respect to the volume change of the metal and the alloy phase, the excellent uniformity of the ion distribution and the excellent physical and chemical stability to the anode of the present invention. As a result, the dendrite formation and the pulverization of the lithium can be effectively prevented to improve the cycle efficiency and life.

The dangling bond existing on the surface of the carbon material or the oxide material has the higher chemical activity to easily decompose the solvent. The absorption of the complex made up of the transition metal ion and the imide anion suppresses the solvent decomposition to largely reduce the irreversible capacity so that the charge-discharge efficiency is not decreased.

The lithium-containing composite oxide such as $LiCoO_2$, $LiNiO_2$ and $LiMn_2O_4$ is used as the cathode active material of the present invention, and the transition metal in these lithium-containing composite oxides may be replaced with another element.

The lithium-containing composite oxide also may be used which has a plateau at 4.5V or more with respect to a metal lithium counter electrode potential. A spinel-type lithium-manganese composite oxide, an olivine-type lithium-containing composite oxide and an inverse spinel-type lithium-containing composite oxide are exemplified as the lithium-containing composite oxide. For example, the lithium-containing composite oxide can be a compound designated by the following general formula (I).

$$Li_a(M_xMn_{2-x})O_4 \qquad (I)$$

(In the formula, "x" and "a" satisfy 0<x<2 and 0<a<1.2, respectively. "M" is at least one selected from the group consisting of Ni, Co, Fe, Cr and Cu).

The cathode of the present invention can be fabricated by dispersing the active material with an electro-conductive material such as carbon black and a bonding agent such as polyvinylidene fluoride (PVDF) in a solvent such as N-methyl-2-pyrrolidone (NMP) followed by mixing and applying the mixture on a substrate such as an aluminum foil.

The lithium secondary battery of the present invention can be fabricated by, after the cathode and the anode are stacked by sandwiching a separator therebetween or further the stacked cathode and anode are wound, accommodating the stacked cathode and anode in a battery can or by sealing the same by using a flexible film made of a stacked member having synthetic resin and a metal foil in dry air or in an inert gas atmosphere.

A porous film such as polyolefin including polypropylene and polyethylene, and fluorocarbon resin is used as the separator.

The battery of the present invention may be in the shape of circular cylinder, rectangular or coin without limitation.

EXAMPLES

The electrolyte for the secondary battery and the battery using the same of the present invention will be described in detail by showing Examples. However, the present invention shall not be restricted thereto.

Example 1

(Fabrication of Battery)

An aluminum foil having thickness of 20 µm was used as a cathode current collector and $LiMn_2O_4$ was used as a cathode active material to prepare a cathode. Lithium metal acting as an anode active material was vapor-deposited in thickness of 20 µm on a cooper foil having thickness of 10 µm and acting as an anode current collector to prepare an anode. An electrolyte solution was prepared as follows. A mixed solvent composed of EC and DEC (volume ratio: 30/70) was used as a solvent into which $LiN(C_2F_5SO_2)_2$ (hereinafter abbreviated to as "LiBETI") was dissolved in 1 mol.$L^{-1}$ as a supporting salt. Then, 0.3% in weight of a $Eu^{3+}$ salt having $CF_3SO_3^-$ was melted in the electrolyte, and further 1% in weight of 1,3-propanesultone (hereinafter abbreviated to as "1,3-PS) was added to the electrolyte. The cathode and the anode were stacked to each other sandwiching a separator made of polyethylene to fabricate a secondary battery of this Example.

(Charge-Discharge Cycle Test)

A charging rate was adjusted to 0.05 C, a discharging rate to 0.1 C, a charging final voltage to 4.2V, a discharging final voltage to 3.0V and a utilization rate (discharge depth) of the lithium metal to 33% at a temperature of 20° C. A capacity retention ratio is referred to a value obtained by dividing a discharge capacity (mAh) after 300 cycles by a discharge capacity (mAh) after 10 cycles. The results obtained in the cycle test are shown in Table 1 below.

Examples 2 to 4

Secondary batteries were fabricated in accordance with the procedures of Example 1 except that transition metal ion salts shown in Table 1 were used in place of the $Eu^{3+}$ as an adding agent. The properties of the batteries were evaluated similarly to Example 1. The results are shown in Table 1.

Comparative Example 1

A secondary battery was fabricated in accordance with the procedures of Example 1 except that the $Eu^{3+}$ salt having $CF_3SO_3^-$ was not added. The properties of the battery were evaluated similarly to Example 1. The results are shown in Table 1.

Comparative Example 2

A secondary battery was fabricated in accordance with the procedures of Example 1 except that the 1,3-PS was not added. The properties of the battery were evaluated similarly to Example 1. The results are shown in Table 1.

The batteries of the above Examples after the cycle test were decomposed to take out the anodes which were then rinsed with a DEC solvent. Thereafter, the anode surfaces were investigated with X-ray photoelectron spectroscopy (XPS), energy dispersive X-ray analysis (EDX) or infrared spectroscopy (FT-IR). The results showed the existence of complexes made up of the lanthanoid transition metal and the imide anion on the outer surfaces of the anodes in contact with the electrolytes. The existence of the layers composed of LiF and alloy made up of the lithium and the lanthanoid transition metal was indicated under the metal complexes.

TABLE 1

| | Anode Active Material | Transition Metal Ion | Compound Having Sulfonyl Group | Capacity Retention Ratio(%) after 300 Cycles |
|---|---|---|---|---|
| Example 1 | Li Metal | $Eu^{3+}$ | 1,3-PS | 89.9 |
| Example 2 | Li Metal | $Ho^{3+}$ | 1,3-PS | 85.2 |
| Example 3 | Li Metal | $Nd^{3+}$ | 1,3-PS | 84.7 |
| Example 4 | Li Metal | $Er^{3+}$ | 1,3-PS | 82.8 |
| Comp. Ex 1 | Li Metal | none | 1,3-PS | 40.7 |
| Comp. Ex 2 | Li Metal | $Eu^{3+}$ | none | 78.4 |

The capacity retention ratios of Examples 1 to 4 are significantly higher than that of Comparative Example 1. This is probably because the stability of the film existing on the interface between the anode surface and the electrolyte, and the higher ionic conductivity of the film suppress the irreversible reaction and the dendrite formation. The dendrite formation was observed on the anode surface after cycles in Comparative Example 1.

It was confirmed that the capacity retention ratios of the batteries of Examples 1 to 4 after the cycle tests were elevated or the cycle performances thereof were improved compared with those of Comparative Examples 1 and 2. The comparison among the four adding agents revealed that the system using the $Eu^{3+}$ salt provided the largest effect.

Example 5

A secondary battery was fabricated in accordance with the procedures of Example 1 except that graphite was used in place of the Li metal as the anode active material. The properties of the battery were evaluated similarly to Example 1. The results are shown in Table 2.

Comparative Example 3

A secondary battery was fabricated in accordance with the procedures of Example 5 except that the $Eu^{3+}$ salt having $CF_3SO_3^-$ was not added. The properties of the battery were evaluated similarly to Example 5. The results are shown in Table 2.

Comparative Example 4

A secondary battery was fabricated in accordance with the procedures of Example 5 except that the 1,3-PS was not added. The properties of the battery were evaluated similarly to Example 5. The results are shown in Table 2.

Example 6

A secondary battery was fabricated in accordance with the procedures of Example 1 except that amorphous carbon was used in place of the Li metal as the anode active material and a mixed solvent composed of PC, EC and DEC (volume ratio: 20/20/60) was used as the main solvent in place of the mixed solvent composed of EC and DEC. The properties of the battery were evaluated similarly to Example 1. The results are shown in Table 2.

Comparative Example 5

A secondary battery was fabricated in accordance with the procedures of Example 6 except that the $Eu^{3+}$ salt having $CF_3SO_3^-$ was not added. The properties of the battery were evaluated similarly to Example 6. The results are shown in Table 2.

Comparative Example 6

A secondary battery was fabricated in accordance with the procedures of Example 6 except that the 1,3-PS was not added. The properties of the battery were evaluated similarly to Example 6. The results are shown in Table 2.

Example 7

A secondary battery was fabricated in accordance with the procedures of Example 1 except that graphite having an alloy layer (thickness: 2 μm) composed of Si and Li and vacuum-deposited thereon (Si/Li ratio: 1/4.4, hereinafter abbreviated to as "graphite/Si:Li") was used as the anode active material in place of the Li metal. The properties of the battery were evaluated similarly to Example 1. The results are shown in Table 2.

Comparative Example 7

A secondary battery was fabricated in accordance with the procedures of Example 7 except that the $Eu^{3+}$ salt having $CF_3SO_3^-$ was not added. The properties of the battery were evaluated similarly to Example 7. The results are shown in Table 2.

Comparative Example 8

A secondary battery was fabricated in accordance with the procedures of Example 7 except that the 1,3-PS was not added. The properties of the battery were evaluated similarly to Example 7. The results are shown in Table 2.

TABLE 2

|  | Anode Active Material | Main Solvent | Transition Metal Ion | Compound Having Sulfonyl Group | Capacity Retention Ratio(%) after 300 Cycles |
|---|---|---|---|---|---|
| Example 5 | Graphite | EC/DEC | $Eu^{3+}$ | 1,3-PS | 91.5 |
| Comp. Ex 3 | Graphite | EC/DEC | none | 1,3-PS | 80.2 |
| Comp. Ex 4 | Graphite | EC/DEC | $Eu^{3+}$ | none | 81.3 |
| Example 6 | Amorphous Carbon | PC/EC/DEC | $Eu^{3+}$ | 1,3-PS | 90.1 |
| Comp. Ex 5 | Amorphous Carbon | PC/EC/DEC | none | 1,3-PS | 81.7 |
| Comp. Ex 6 | Amorphous Carbon | PC/EC/DEC | $Eu^{3+}$ | none | 81.2 |
| Example 7 | Graphite/Si:Li | EC/DEC | $Eu^{3+}$ | 1,3-PS | 88.6 |
| Comp. Ex 7 | Graphite/Si:Li | EC/DEC | none | 1,3-PS | 82.3 |
| Comp. Ex 8 | Graphite/Si:Li | EC/DEC | $Eu^{3+}$ | none | 79.4 |

It was confirmed that the capacity retention ratios of the batteries of Examples 5 to 7 after the cycle tests were elevated or the cycle performances thereof were improved compared with those of Comparative Examples 3 to 8.

Example 8

While the metal complex film was formed on the anode surface through the charging and the discharging after the imide anion and the metal ion were added in Example 1, a transition metal complex was added as an adding agent in advance and was adsorbed on an anode surface in Example 8.

A secondary battery was fabricated in accordance with the procedures of Example 1 except that $LiPF_6$ was used in place of the LiBETI, and a metal complex $Eu[N(C_2F_5SO_2)_2]_3$ of 0.1% in weight with respect to the entire electrolyte was used as the adding agent. The properties of the battery were evaluated similarly to Example 1. The results are shown in Table 3.

Examples 9 to 11

Secondary batteries were fabricated in accordance with the procedures of Example 8 except that metal complexes shown in Table 3 were used in place of the $Eu[N(C_2F_5SO_2)_2]_3$. The properties of the batteries were evaluated similarly to Example 8. The results are shown in Table 3.

Comparative Example 9

A secondary battery was fabricated in accordance with the procedures of Example 8 except that the Eu[N(C$_2$F$_5$SO$_2$)$_2$]$_3$ was not used. The properties of the battery were evaluated similarly to Example 8. The results are shown in Table 3.

Comparative Example 10

A secondary battery was fabricated in accordance with the procedures of Example 8 except that the 1,3-PS was not used. The properties of the battery were evaluated similarly to Example 8. The results are shown in Table 3.

TABLE 3

|  | Anode Active Material | Metal Complex | Compound Having Sulfonyl Group | Capacity Retention Ratio(%) after 300 Cycles |
|---|---|---|---|---|
| Example 8 | Li Metal | Eu[N(C$_2$F$_5$SO$_2$)$_2$]$_3$ | 1,3-PS | 91.2 |
| Example 9 | Li Metal | Ho[N(C$_2$F$_5$SO$_2$)$_2$]$_3$ | 1,3-PS | 86.4 |
| Example 10 | Li Metal | Nd[N(C$_2$F$_5$SO$_2$)$_2$]$_3$ | 1,3-PS | 85.5 |
| Example 11 | Li Metal | Er[N(C$_2$F$_5$SO$_2$)$_2$]$_3$ | 1,3-PS | 84.1 |
| Comp. Ex 9 | Li Metal | none | 1,3-PS | 45.4 |
| Comp. Ex 10 | Li Metal | Eu[N(C$_2$F$_5$SO$_2$)$_2$]$_3$ | none | 79.1 |

The capacity retention ratios of Examples 8 to 11 are significantly higher than those of Comparative Examples 9 and 10. This is probably because the stability of the film existing on the interface between the anode surface and the electrolyte and the higher ionic conductivity of the film suppress the irreversible reaction and the dendrite formation. The dendrite formation was observed on the anode surface after cycles in Comparative Example 1.

It was confirmed that the capacity retention ratios of the batteries of Examples 8 to 11 after the cycle tests were elevated or the cycle performances thereof were improved compared with those of Comparative Examples 9 and 10. The comparison among the four adding agents (complexes) revealed that the system using the Eu as a central metal provided the largest effect.

Example 12

A secondary battery was fabricated in accordance with the procedures of Example 8 except that graphite was used in place of the Li metal as the anode active material. The properties of the battery were evaluated similarly to Example 8. The results are shown in Table 4.

Comparative Example 11

A secondary battery was fabricated in accordance with the procedures of Example 12 except that the Eu[N(C$_2$F$_5$SO$_2$)$_2$]$_3$ was not used. The properties of the battery were evaluated similarly to Example 12. The results are shown in Table 4.

Comparative Example 12

A secondary battery was fabricated in accordance with the procedures of Example 12 except that the 1,3-PS was not used. The properties of the battery were evaluated similarly to Example 12. The results are shown in Table 4.

Example 13

A secondary battery was fabricated in accordance with the procedures of Example 8 except that amorphous carbon was used in place of the Li metal as the anode active material and a mixed solvent composed of PC, EC and DEC (volume ratio: 20/20/60) was used as the main solvent in place of the mixed solvent composed of EC and DEC. The properties of the battery were evaluated similarly to Example 8. The results are shown in Table 4.

Comparative Example 13

A secondary battery was fabricated in accordance with the procedures of Example 13 except that the Eu[N(C$_2$F$_5$SO$_2$)$_2$]$_3$ was not used. The properties of the battery were evaluated similarly to Example 13. The results are shown in Table 4.

Comparative Example 14

A secondary battery was fabricated in accordance with the procedures of Example 13 except that the 1,3-PS was not used. The properties of the battery were evaluated similarly to Example 13. The results are shown in Table 4.

Example 14

A secondary battery was fabricated in accordance with the procedures of Example 8 except that graphite having an alloy layer (thickness: 2 μm) composed of Si and Li and vacuum-deposited thereon (Si/Li ratio: 1/4.4, hereinafter abbreviated to as "graphite/Si:Li") was used as the anode active material in place of the Li metal. The properties of the battery were evaluated similarly to Example 8. The results are shown in Table 4.

Comparative Example 15

A secondary battery was fabricated in accordance with the procedures of Example 14 except that the Eu[N(C$_2$F$_5$SO$_2$)$_2$]$_3$ was not used. The properties of the battery were evaluated similarly to Example 14 The results are shown in Table 4.

Comparative Example 16

A secondary battery was fabricated in accordance with the procedures of Example 14 except that the 1,3-PS was not used. The properties of the battery were evaluated similarly to Example 14. The results are shown in Table 4.

TABLE 4

|  | Anode Active Material | Main Solvent | Metal Complex | Compound Having Sulfonyl Group | Capacity Retention Ratio(%) after 300 Cycles |
|---|---|---|---|---|---|
| Example 12 | Graphite | EC/DEC | Eu[N(C$_2$F$_5$SO$_2$)$_2$]$_3$ | 1,3-PS | 92.7 |
| Comp. Ex 11 | Graphite | EC/DEC | none | 1,3-PS | 80.9 |
| Comp. Ex 12 | Graphite | EC/DEC | Eu[N(C$_2$F$_5$SO$_2$)$_2$]$_3$ | none | 82.5 |
| Example 13 | Amorphous | PC/EC/ | Eu[N(C$_2$F$_5$SO$_2$)$_2$]$_3$ | 1,3-PS | 91.2 |

TABLE 4-continued

|  | Anode Active Material | Main Solvent | Metal Complex | Compound Having Sulfonyl Group | Capacity Retention Ratio(%) after 300 Cycles |
|---|---|---|---|---|---|
| Comp. Ex 13 | Amorphous Carbon | DEC PC/EC/ DEC | none | 1,3-PS | 82.6 |
| Comp. Ex 14 | Amorphous Carbon | PC/EC/ DEC | Eu[N($C_2F_5SO_2$)$_2$]$_3$ | none | 81.8 |
| Example 14 | Graphite/ Si:Li | EC/DEC | Eu[N($C_2F_5SO_2$)$_2$]$_3$ | 1,3-PS | 90.1 |
| Comp. Ex 15 | Graphite/ Si:Li | EC/DEC | none | 1,3-PS | 82.3 |
| Comp. Ex 16 | Graphite/ Si:Li | EC/DEC | Eu[N($C_2F_5SO_2$)$_2$]$_3$ | none | 80.5 |

It was confirmed that the capacity retention ratios of the batteries of Examples 12 to 14 after the cycle tests were elevated or the cycle performances thereof were improved compared with those of Comparative Examples 11 to 16.

Example 15

In Example 15, an electrolyte was prepared by further adding vinylene carbonate (VC) as an adding agent to the electrolyte of Example 8.

A secondary battery was fabricated in accordance with the procedures of Example 8 except that 1% in weight of the VC was further added to the electrolyte. The properties of the battery were evaluated similarly to Example 8. The results are shown in Table 5.

Examples 16 to 18

Secondary batteries were fabricated in accordance with the procedures of Example 15 except that materials shown in Table 5 were used as the anode active material in place of the Li metal. The properties of the batteries were evaluated similarly to Example 15. The results are shown in Table 5.

TABLE 5

|  | Anode Active Material | Main Solvent | Metal Complex | Compound Having Sulfonyl Group | V C Compound | Capacity Retention Ratio(%) |
|---|---|---|---|---|---|---|
| Ex. 15 | Li Metal | EC/DEC | Eu[N($C_2F_5SO_2$)$_2$]$_3$ | 1,3-PS | VC | 93.6 |
| Ex. 16 | Amorphous Carbon | PC/EC/ DEC | Eu[N($C_2F_5SO_2$)$_2$]$_3$ | 1,3-PS | VC | 92.8 |
| Ex. 17 | Graphite | EC/DEC | Eu[N($C_2F_5SO_2$)$_2$]$_3$ | 1,3-PS | VC | 93.9 |
| Ex. 18 | Graphite/ Si:Li | EC/DEC | Eu[N($C_2F_5SO_2$)$_2$]$_3$ | 1,3-PS | VC | 92.6 |

*) The capacity retention ratios are values after 300 cycles.

It was confirmed that the capacity retention ratios of the batteries of Examples 15 to 18 after the cycle tests were elevated or the cycle performances thereof were improved when the VC was further added to the electrolyte containing the metal complex and the compound having the sulfonyl group compared with those of Example 8 and Examples 12 to 14.

The invention claimed is:

1. An electrolyte for a secondary battery comprising:
   an aprotic solvent including an electrolyte salt;
   an imide anion and a transition metal ion, which are in the aprotic solvent and can form a metal complex on an anode at least through a charge-discharge process; and
   a compound comprising a sulfonyl group in the aprotic solvent.

2. The electrolyte for the secondary battery as defined in claim 1, wherein the compound having the sulfonyl group comprises at least one compound selected from the group consisting of 1,3-propanesultone, 1,4-butanesultone, sulfolene, alkane sulfonic acid anhydride, a γ-sultone compound and a sulfolene compound.

3. The electrolyte for the secondary battery as defined in claim 1, further comprising:
   at least one of vinylene carbonate and its derivative.

4. The electrolyte for the secondary battery as defined in claim 1, wherein the transition metal comprises a lanthanoid metal.

5. The electrolyte for the secondary battery as defined in claim 4, wherein the lanthanoid metal is selected from a group consisting of europium, neodymium, erbium and holmium.

6. The electrolyte for the secondary battery as defined in claim 1, wherein the imide anion comprises —N($C_nF_{2n+1}$SO$_2$)($C_mF_{2m+1}$SO$_2$) ("n" and "m" are natural numbers).

7. The electrolyte for the secondary battery as defined in claim 1, wherein the imide anion or its metal complex is included in the electrolyte in a range from 0.005 to 10% in weight.

8. The electrolyte for the secondary battery as defined in claim 1, wherein the compound having the sulfonyl group is included in the electrolyte in a range from 0.01 to 10% in weight.

9. The electrolyte for the secondary battery as defined in claim 1, wherein the aprotic solvent comprises at least one organic solvent selected from the group consisting of cyclic carbonates, linear carbonates, aliphatic carboxylate esters, γ-lactones, cyclic ethers, linear ethers and their fluorinated derivatives.

10. A secondary battery comprising:
   a cathode and an anode; and
   the electrolyte far the secondary battery defined in claim 1.

11. The secondary battery as defined in claim 10, wherein, the cathode comprises a lithium-containing composite oxide which can occlude and release lithium.

12. The secondary battery as defined in claim 10, wherein the anode comprises a material selected from the group consisting of a material which can occlude and release lithium; lithium metal; a metal material which can form an alloy with the lithium and an oxide material, and a mixture composed of two or more of the materials.

13. The secondary battery as defined in claim 12, wherein the material which can occlude and release lithium comprises carbon.

14. The secondary battery as defined in claim 13, wherein the carbon comprises graphite.

15. The secondary battery as defined in claim 13, wherein the carbon comprises amorphous carbon.

16. The electrolyte for the secondary battery as defined in claim 1, wherein said sulfonyl group comprises a group which is other than included in said imide anion and other than included in said electrolyte salt.

17. An electrolyte for a secondary battery comprising:
   an aprotic solvent comprising a lithium salt as an electrolyte salt; and
   a metal complex comprising an imide anion and a transition metal ion, and a compound having a sulfonyl group formed in the aprotic solvent.

18. The electrolyte for the secondary battery as defined in claim 17, wherein the lithium salt comprises at least one lithium salt selected from the group consisting of $LiPF_6$, $LiBF_4$, $LiAsF_6$, $LiSbF_6$, $LiClO_4$, $LiAlCl_4$, $LiN(C_nF_{2n+1}SO_2)(C_mF_{2m+1}SO_2)$ ("n" and "m" are natural numbers).

19. The electrolyte for the secondary battery as defined in claim 17, wherein the compound having the sulfonyl group comprises at least one compound selected from the group consisting of 1,3-propanesultone, 1,4-butanesultone, sulfolene, alkane sulfonic acid anhydride, a γ-sultone compound and a sulfolene compound.

20. The electrolyte for the secondary battery as defined in claim 17, further comprising:
   at least one of vinylene carbonate and its derivative.

21. The electrolyte for the secondary battery as defined in claim 17, wherein the transition metal comprises is a lanthanoid metal.

22. A method of forming an electrolyte for a secondary battery comprising:
   providing an imide anion and a transition metal ion in an aprotic solvent including an electrolyte salt; and
   after said providing said imide anion and said transition metal ion in said aprotic solvent, dissolving a compound comprising a sulfonyl group in said aprotic solvent.

23. The method according to claim 22, wherein said providing said imide anion and said transition metal ion in said aprotic solvent comprises one of:
   dissolving an imide compound and a transition metal salt in said aprotic solvent; and
   forming a metal complex comprising a transition metal ion and an imide anion, and dissolving said metal complex in said aprotic solvent.

* * * * *